(12) United States Patent
Ramsey et al.

(10) Patent No.: US 8,330,311 B2
(45) Date of Patent: Dec. 11, 2012

(54) MAGNETIC THRUST BEARING WITH INTEGRATED ELECTRONICS

(75) Inventors: Gary Ramsey, Roanoke, VA (US); Christopher Sortore, Roanoke, VA (US); Robert Jett Field, Fincastle, VA (US); Victor Iannello, Roanoke, VA (US); Kirk Treubert, Roanoke, VA (US); Mark Hanson, Fincastle, VA (US)

(73) Assignee: Dresser-Rand Company, Olean, NY (US)

( * ) Notice: Subject to any disclaimer, the term of this patent is extended or adjusted under 35 U.S.C. 154(b) by 674 days.

(21) Appl. No.: 12/424,869

(22) Filed: Apr. 16, 2009

(65) Prior Publication Data

US 2009/0265038 A1  Oct. 22, 2009

Related U.S. Application Data

(60) Provisional application No. 61/046,171, filed on Apr. 18, 2008.

(51) Int. Cl.
 *F16C 19/30* (2006.01)
(52) U.S. Cl. ..................... 310/90.5; 310/68 R
(58) Field of Classification Search ............. 310/68 B, 310/90.5, 68 R
See application file for complete search history.

(56) References Cited

U.S. PATENT DOCUMENTS

| | | |
|---|---|---|
| 2,221,983 A | 11/1940 | Mayer |
| 2,408,641 A | 10/1946 | Hitchcock |
| 2,877,366 A | 3/1959 | Carr |
| 3,146,300 A | 8/1964 | Beckius |
| 3,221,194 A | 11/1965 | Blackburn |
| 3,715,659 A | 2/1973 | Abnett et al. |
| 3,777,194 A | 12/1973 | Schaefer |
| 4,080,012 A | 3/1978 | Boden |
| 4,112,751 A | 9/1978 | Grunbaum |
| 4,117,360 A | 9/1978 | Richter |
| 4,144,469 A | 3/1979 | Miyashita |
| 4,177,360 A | 12/1979 | Fujimoto |
| 4,199,952 A | 4/1980 | Berg |
| 4,245,869 A | 1/1981 | Scheffer |
| 4,270,936 A | 6/1981 | Mann |
| 4,286,010 A | 8/1981 | Staley |
| 4,353,602 A | 10/1982 | Habermann |
| 4,389,849 A | 6/1983 | Gasser |

(Continued)

FOREIGN PATENT DOCUMENTS

CN  2706952  6/2005

(Continued)

OTHER PUBLICATIONS

Boylestad, "Electronic Devices and Circuit Theory, 5th edition", Jan. 1, 1992, pp. 698-699, Prentice Hall.

(Continued)

*Primary Examiner* — Quyen Leung
*Assistant Examiner* — David Scheuermann
(74) *Attorney, Agent, or Firm* — Edmonds & Nolte, PC

(57) ABSTRACT

A machine is provided, including a magnetic thrust bearing having a rotor portion, a stator portion, and a housing. The housing substantially surrounds the stator portion and the rotor portion. The rotor portion includes a thrust disk adapted to be circumferentially attached to a rotor and to rotate with the rotor. The thrust disk defines a thrust disk first side and a thrust disk second side, the first side being opposite to the second side.

23 Claims, 6 Drawing Sheets

U.S. PATENT DOCUMENTS

| | | |
|---|---|---|
| 4,618,792 A | 10/1986 | Yates |
| 4,650,132 A | 3/1987 | Graf |
| 4,703,662 A | 11/1987 | Gabelli |
| 4,742,258 A | 5/1988 | Earle |
| 4,893,040 A | 1/1990 | Turner |
| 4,896,088 A | 1/1990 | Jahns |
| 4,920,291 A | 4/1990 | McSparran |
| 4,962,085 A | 10/1990 | deBarbadillo |
| 4,962,089 A | 10/1990 | Boden |
| 4,982,126 A | 1/1991 | Jolivet |
| 5,013,987 A | 5/1991 | Wakui |
| 5,021,698 A | 6/1991 | Pullen |
| 5,136,854 A | 8/1992 | Abdelmalek |
| 5,153,475 A | 10/1992 | McSparran |
| 5,250,865 A | 10/1993 | Meeks |
| 5,256,638 A | 10/1993 | Weinberger |
| 5,291,735 A | 3/1994 | Kesten |
| 5,300,841 A | 4/1994 | Preston |
| 5,300,842 A | 4/1994 | Lyons |
| 5,300,843 A | 4/1994 | Lyons |
| 5,327,069 A | 7/1994 | Radun |
| 5,347,190 A | 9/1994 | Lewis |
| 5,355,041 A | 10/1994 | Shirao |
| 5,355,042 A | 10/1994 | Lewis |
| 5,434,427 A | 7/1995 | Crane |
| 5,469,007 A | 11/1995 | Toyama |
| 5,530,306 A | 6/1996 | Ueyama |
| 5,539,323 A | 7/1996 | Davis |
| 5,554,583 A | 9/1996 | Hull |
| 5,565,722 A | 10/1996 | Rubner |
| 5,578,880 A | 11/1996 | Lyons |
| 5,682,071 A | 10/1997 | Buhler |
| 5,705,918 A | 1/1998 | Davis |
| 5,729,066 A | 3/1998 | Soong |
| 5,739,609 A | 4/1998 | Ueyama |
| 5,743,654 A | 4/1998 | Ide |
| 5,757,196 A | 5/1998 | Wetzel |
| 5,760,510 A | 6/1998 | Nomura |
| 5,761,921 A | 6/1998 | Hori |
| 5,808,392 A | 9/1998 | Sakai |
| 5,811,905 A | 9/1998 | Tang |
| 5,857,348 A | 1/1999 | Conry |
| 5,866,964 A | 2/1999 | Li |
| 5,872,507 A | 2/1999 | Weber |
| 5,878,584 A | 3/1999 | Sasaki |
| 5,880,549 A | 3/1999 | Chiba |
| 5,894,210 A | 4/1999 | Brown |
| 5,923,142 A | 7/1999 | Li |
| 5,936,370 A | 8/1999 | Fukao |
| 5,939,807 A | 8/1999 | Patyk |
| 5,955,811 A | 9/1999 | Chiba |
| 5,962,942 A | 10/1999 | Pullen |
| 5,973,468 A | 10/1999 | Yamauchi |
| 6,014,002 A | 1/2000 | Guinet |
| 6,040,650 A | 3/2000 | Rao |
| 6,050,083 A | 4/2000 | Meckler |
| 6,104,111 A | 8/2000 | Pullen |
| 6,147,425 A | 11/2000 | Ueyama |
| 6,148,634 A | 11/2000 | Sherwood |
| 6,181,092 B1 | 1/2001 | Turner |
| 6,184,640 B1 | 2/2001 | Kawashima |
| 6,194,800 B1 | 2/2001 | Maruyama |
| 6,195,869 B1 | 3/2001 | Pullen |
| 6,198,183 B1 | 3/2001 | Baeumel |
| 6,198,803 B1 | 3/2001 | Osama |
| 6,208,051 B1 | 3/2001 | Ando |
| 6,233,938 B1 | 5/2001 | Nicodemus |
| 6,253,563 B1 | 7/2001 | Ewert |
| 6,304,011 B1 | 10/2001 | Pullen |
| 6,309,188 B1 | 10/2001 | Danner |
| 6,326,712 B1 | 12/2001 | Nakazawa |
| 6,346,757 B1 | 2/2002 | Shinozaki |
| 6,362,549 B1 | 3/2002 | Shi |
| 6,380,652 B1 | 4/2002 | Ueyama |
| 6,388,981 B1 | 5/2002 | Sohn |
| 6,404,097 B1 | 6/2002 | Pullen |
| 6,424,069 B1 | 7/2002 | Pullen |
| 6,441,580 B2 | 8/2002 | Marcinkiewicz |
| 6,455,966 B1 | 9/2002 | Barada |
| 6,469,487 B2 | 10/2002 | Ewert |
| 6,472,787 B1 | 10/2002 | Kameno |
| 6,483,212 B1 | 11/2002 | Mimura |
| 6,486,683 B1 | 11/2002 | Nussbaum |
| 6,489,701 B1 | 12/2002 | Gamble |
| 6,515,387 B1 | 2/2003 | Shinozaki |
| 6,519,273 B2 | 2/2003 | Sekiguchi |
| 6,559,568 B2 | 5/2003 | Maejima |
| 6,570,285 B2 | 5/2003 | Shinozaki |
| 6,590,366 B1 | 7/2003 | Browning |
| 6,617,733 B1 | 9/2003 | Yamauchi |
| 6,617,734 B2 | 9/2003 | Taniguchi |
| 6,657,345 B2 | 12/2003 | Shinozaki |
| 6,657,348 B2 | 12/2003 | Quin |
| 6,666,134 B2 | 12/2003 | Gusching |
| 6,735,945 B1 | 5/2004 | Hall |
| 6,770,992 B2 | 8/2004 | Yamauchi |
| 6,777,841 B2 | 8/2004 | Steinmeyer |
| 6,798,097 B2 | 9/2004 | Pullen |
| 6,809,449 B2 | 10/2004 | Shinozaki |
| 6,809,450 B1 | 10/2004 | Morrison |
| 6,822,355 B2 | 11/2004 | Karrelmeyer |
| 6,831,384 B2 | 12/2004 | Ries |
| 6,849,979 B2 | 2/2005 | Brunet |
| 6,873,075 B2 | 3/2005 | Taira |
| 6,892,522 B2 | 5/2005 | Brasz |
| 6,912,773 B2 | 7/2005 | Pullen |
| 6,927,550 B2 | 8/2005 | Tamisier |
| 6,949,853 B2 | 9/2005 | Kawashima |
| 6,984,907 B2 | 1/2006 | Barada |
| 6,997,010 B2 | 2/2006 | Suzuki |
| 7,002,273 B2 | 2/2006 | Schippl |
| 7,005,864 B2 | 2/2006 | Iannello |
| 7,013,644 B2 | 3/2006 | Radcliff |
| 7,017,357 B2 | 3/2006 | Brasz |
| 7,023,118 B1 | 4/2006 | Morrison |
| 7,053,511 B2 | 5/2006 | Taniguchi |
| 7,053,582 B2 | 5/2006 | Ueyama |
| 7,065,979 B2 | 6/2006 | Arshansky |
| 7,091,641 B2 | 8/2006 | Kawashima |
| 7,138,738 B2 | 11/2006 | Shimada |
| 7,156,627 B2 | 1/2007 | Lenderink |
| 7,235,907 B2 | 6/2007 | Shimada |
| 7,268,453 B2 | 9/2007 | Shimada |
| 7,274,123 B2 | 9/2007 | Shimada |
| 7,285,887 B2 | 10/2007 | Shimada |
| 7,288,915 B2 | 10/2007 | Norman |
| 7,343,663 B2 | 3/2008 | Hodowanec |
| 7,355,833 B2 | 4/2008 | Kozaki |
| 7,394,229 B2 | 7/2008 | Lim |
| 7,436,093 B2 | 10/2008 | Brunet |
| 7,466,051 B2 | 12/2008 | Miya |
| 7,471,022 B2 | 12/2008 | Sortore |
| 7,501,782 B2 | 3/2009 | Buhler |
| 7,536,869 B2 | 5/2009 | Inaba |
| 7,545,066 B2 | 6/2009 | Baudelocque |
| 7,564,670 B2 | 7/2009 | Kozaki |
| 7,583,000 B2 | 9/2009 | Durham |
| 7,633,201 B2 | 12/2009 | Buhler |
| 7,635,937 B2 | 12/2009 | Brunet |
| 7,679,248 B2 | 3/2010 | Kozaki |
| 7,687,948 B2 | 3/2010 | Sortore |
| 7,737,590 B2 | 6/2010 | Oyama |
| 7,932,655 B2 | 4/2011 | Buhler |
| 7,944,104 B2 | 5/2011 | Barada |
| 7,977,839 B2 | 7/2011 | Barada |
| 7,986,070 B2 | 7/2011 | Baudelocque |
| 8,018,106 B2 | 9/2011 | Buhler |
| 2001/0024099 A1 | 9/2001 | Greif |
| 2002/0029897 A1 | 3/2002 | Younsi |
| 2002/0148225 A1 | 10/2002 | Lewis |
| 2002/0149331 A1 | 10/2002 | Marcinkiewicz |
| 2002/0176943 A1 | 11/2002 | Pereira |
| 2003/0038553 A1 | 2/2003 | Andres |
| 2003/0132673 A1 | 7/2003 | Zhou |
| 2004/0046467 A1 | 3/2004 | Huang |
| 2004/0088992 A1 | 5/2004 | Brasz |
| 2004/0189132 A1 | 9/2004 | Horst |

| | | | |
|---|---|---|---|
| 2005/0070275 | A1 | 3/2005 | Jeyaseelan |
| 2005/0077793 | A1 | 4/2005 | Garvey |
| 2005/0110363 | A1 | 5/2005 | Hoffmann |
| 2005/0223737 | A1 | 10/2005 | Conry |
| 2006/0026981 | A1 | 2/2006 | Inaba |
| 2006/0243683 | A1 | 11/2006 | Onachilla |
| 2006/0273683 | A1 | 12/2006 | Caprio |
| 2007/0200438 | A1 | 8/2007 | Kaminski |
| 2007/0200440 | A1 | 8/2007 | Kalsi |
| 2007/0273322 | A1 | 11/2007 | Ramu |
| 2008/0045413 | A1 | 2/2008 | Ko |
| 2008/0073993 | A1 | 3/2008 | Sortore |
| 2008/0238234 | A1 | 10/2008 | Saban |
| 2009/0261678 | A1 | 10/2009 | Sortore |
| 2009/0265038 | A1* | 10/2009 | Ramsey et al. ............... 700/279 |
| 2010/0009833 | A1 | 1/2010 | Ryu |
| 2011/0316376 | A1 | 12/2011 | Sortore |

FOREIGN PATENT DOCUMENTS

| | | |
|---|---|---|
| CN | 101438358 | 5/2009 |
| DE | 2355104 | 5/1975 |
| EP | 0411697 | 7/1990 |
| EP | 0693630 | 2/1996 |
| EP | 1063753 | 12/2000 |
| FR | 2574880 | 6/1986 |
| JP | 09-149572 | 6/1997 |
| RU | 2241296 | 11/2004 |
| SU | 1830591 | 7/1993 |
| WO | WO0035230 | 6/2000 |
| WO | WO02096146 | 11/2002 |
| WO | WO2006061671 | 6/2006 |
| WO | WO2008039124 | 4/2008 |
| WO | WO2009140022 | 11/2009 |
| WO | WO2009146189 | 12/2009 |
| WO | WO2011005552 | 1/2011 |
| WO | WO2011163456 | 12/2011 |

OTHER PUBLICATIONS

EP 0 693 630—European Search Report dated Oct. 31, 1997.

PCT/SE2006/050348—International Search Report dated Feb. 24, 2007.

PCT/US2007/014090—International Search Report and Written Opinion mailed Aug. 25, 2008.

PCT/US2007/014090—International Preliminary Report on Patentability mailed Dec. 15, 2008.

PCT/US2009/040790—International Search Report and Written Opinion mailed Jun. 9, 2009.

PCT/US2009/040735—International Search Report and Written Opinion mailed Jun. 16, 2009.

PCT/US2009/059481—International Search Report and Written Opinion mailed Sep. 9, 2010.

PCT/US2009/040735—International Preliminary Report on Patentability mailed Oct. 19, 2010.

PCT/US2009/040790—International Preliminary Report on Patentability mailed Oct. 19, 2010.

PCT/US2010/039582—International Search Report and Written Opinion mailed May 31, 2011.

PCT/US2011/041593—International Search Report and Written Opinion mailed Oct. 31, 2011.

PCT/US2010/039582—International Preliminary Report on Patentability dated Jan. 4, 2012.

PCT/US2009/059481—International Preliminary Report on Patentability mailed Apr. 19, 2012.

Mushi, "Design, Construction and Modeling of a Flexible Rotor Active Magnetic Bearing Test Rig" 2009, 10 page(s), Draft-Proceedings of ASME Turbo Expo 2010: Power for Land, Sea and Air, Jun. 14-18, 2010, Glasgow, UK.

Ferreiro Garcia et al., "Diagnosis of Active Magnetic Bearings" [Diagnosis de Cojinetes Magneticos Activos], XXVII Automation Symposium, Year 2001, Sep. 5-7, University of Huelva, Spain (D3).

Klyukhin, "Analysis of Eddy Current Distributions in the CMS Magnet Yoke During the Solenoid Discharge", Jun. 2005, 4 pages, IEEE Transactions on Nuclear Science, vol. 52, No. 3.

* cited by examiner

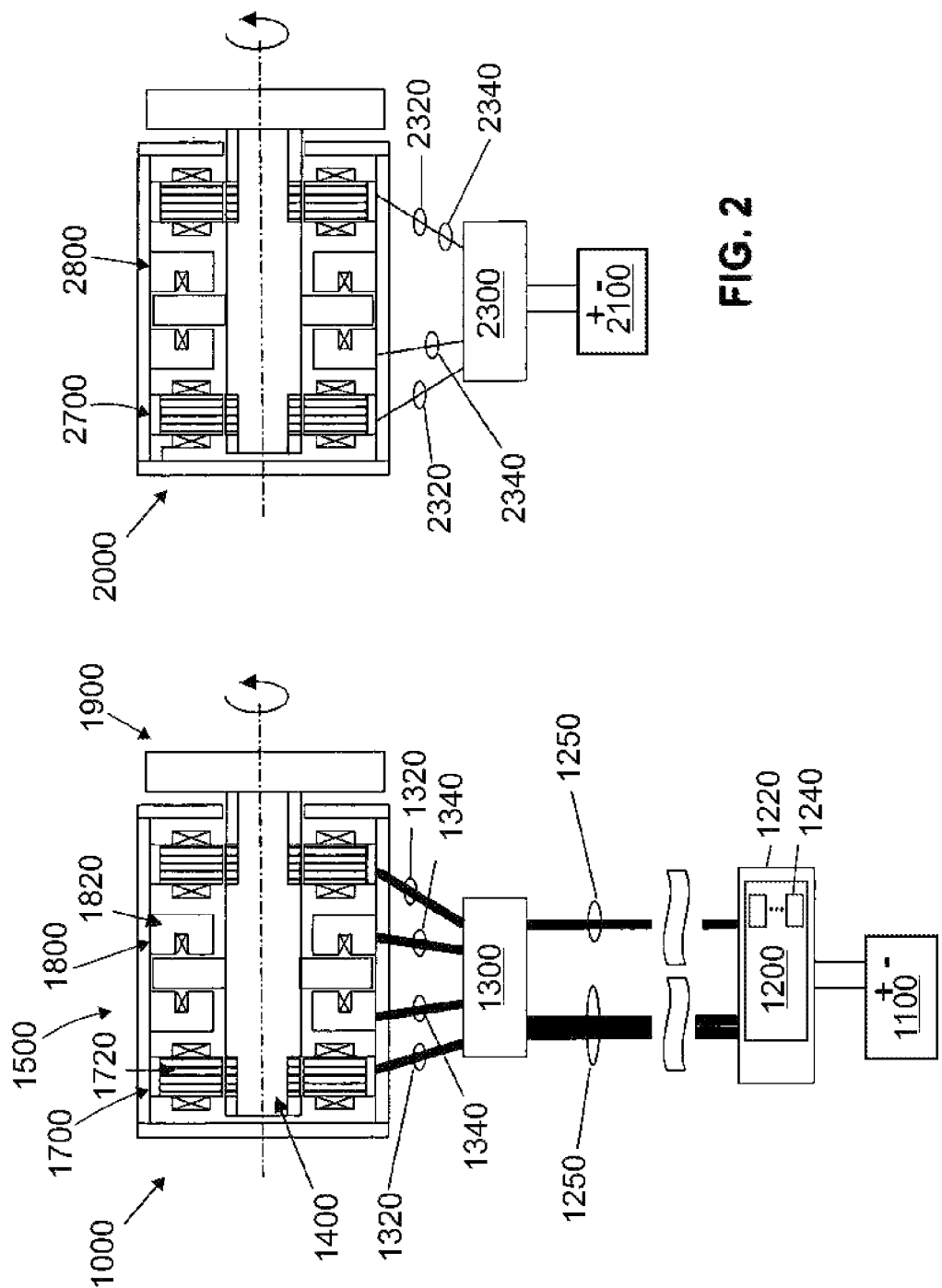

MAGNETIC THRUST BEARING WITH INTEGRATED ELECTRONICS

CROSS-REFERENCES TO RELATED APPLICATIONS

This application claims priority to U.S. Provisional Patent Application Ser. No. 61/046,171, filed 18 Apr. 2008.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 1 is a schematic view of an exemplary embodiment of a system 1000;

FIG. 2 is a schematic view of an exemplary embodiment of a system 2000;

DETAILED DESCRIPTION

Figure 4:
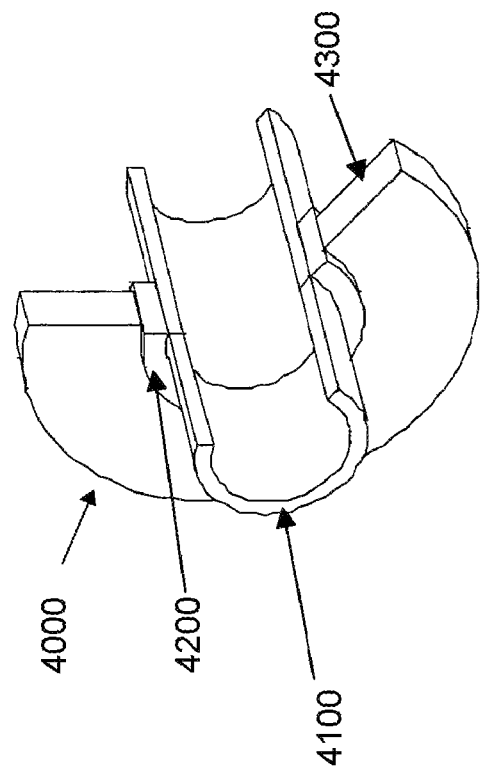
FIG. 4 is a perspective cut-away view of an exemplary embodiment of a system 4000.

Certain exemplary embodiments can provide a compact, high performance, low-cost magnetic thrust bearing for machinery with rotating shafts. Through a novel design, the electronics for the magnetic thrust bearing, including sensor conditioning, digital processing, and/or power amplification, can be packaged within its stator structure. This can greatly simplify the applicability of the magnetic bearing and/or can simplify the integration of the magnetic bearing into a machine. Included in the magnetic bearing can be touchdown surfaces that can support the shaft when the magnetic bearing is powered down and/or has failed.

Magnetic bearings can be used to support and/or position rotating machinery for applications in which the bearings have one or more of the following requirements:

No mechanical wear;
No lubrication;
High rotational speeds (between approximately 3,600 and approximately 100,000 rpm);
Operation in harsh environment; and/or
Low frictional losses.

As shown in FIG. 1, certain exemplary magnetic bearing systems 1000 can be comprised of electromagnets and sensors that can be located in the machine 1900 and an electronic controller 1200 that can be located in a separate enclosure 1220. Wiring between the enclosure 1220 and the magnetic bearings 1700, 1800 can carry respective electrical currents for the electromagnets and/or the signals to the sensors, both of which can be located in stator 1500. A radial bearing 1700, which can support the rotating shaft 1400 along the lateral directions, can be comprised of 4 electromagnets 1720 and 4 sensors. A thrust bearing 1800, which can support the rotating shaft 1400 along the longitudinal (axial) direction, can be comprised of 2 electromagnets 1820 and 2 sensors. A complete 5-axis system can be comprised of 2 radial bearings 1700 and a thrust bearing 1800 for a total of 10 electromagnets and 10 sensors. Each electromagnet can require two wires, and each sensor, depending on the type and configuration of the sensor, can require two additional wires, for a total of 16 wires 1320, 1340. As shown in FIG. 1, for the positioning of a rotating shaft 1400 along 5 axes, a total of 40 wires 1250 can be required between the machine 1900 and the electronic controller 1200.

The distance between the machine 1900 and the electronic controller 1200 can vary for each installation, and can be as much as several hundred feet (e.g., 300 feet). Because the performance of the sensors and amplifiers can be dependent on the length of the leads between the magnetic bearings 1700, 1800 and the digital controller 1200, each installation can require installation-specific, onsite tuning, calibration, and/or optimization. In certain situations, this onsite tuning, calibration, and/or optimization can be inconvenient and/or expensive.

Electrical power can flow from the power supply 1100 to the amplifiers 1240 (which can be located in electronic controller 1200), to junction box 1300, and/or to the magnetic bearings 1700, 1800. The amplifiers 1240 can be switch-type, pulse-width modulated (PWM) amplifiers that can be very efficient. Because each coil in the magnetic bearing 1700, 1800 can behave as a large inductor in series with a small resistance, the reactive power can be high, but the actual power that flows to the magnetic bearings 1700, 1800 can be quite small, even for large current levels in the magnetic bearing 1700, 1800. Because little power can be dissipated in the amplifier 1240 and the coil, the current flowing between the power supply 1100 and the amplifier 1240 for each coil can be a small fraction of the current flow in the coil. It is common for the current flow in the coils to be approximately 10 times higher than the current flow to the amplifiers 1240.

Because the current flowing between the amplifiers and coils can be so much greater than the current between the power supply and the amplifiers, it can be advantageous to keep the amplifiers and/or the coils as close as possible to reduce the cost and complexity of wiring. In certain exemplary embodiments, the electronic controller can be integrated into the magnetic bearing and/or the amplifiers can be located in very close proximity to the coils. This is shown in FIG. 2, in which each exemplary magnetic bearing 2700, 2800 can require only 2 (low current) power leads 2320, 2340. A junction box 2300 can connect the positive and negative leads of each bearing 2700, 2800, which in turn can be connected to the positive and negative terminals of a power supply 2100.

For certain exemplary embodiments, there need be no long leads that can emit electromagnetic interference (EMI). In certain exemplary embodiments, the leads between the amplifiers and the coils can be short and/or completely within the bearing 2700, 2800 so the amount of EMI produced is a small fraction of conventional magnetic bearings.

Figure 3:
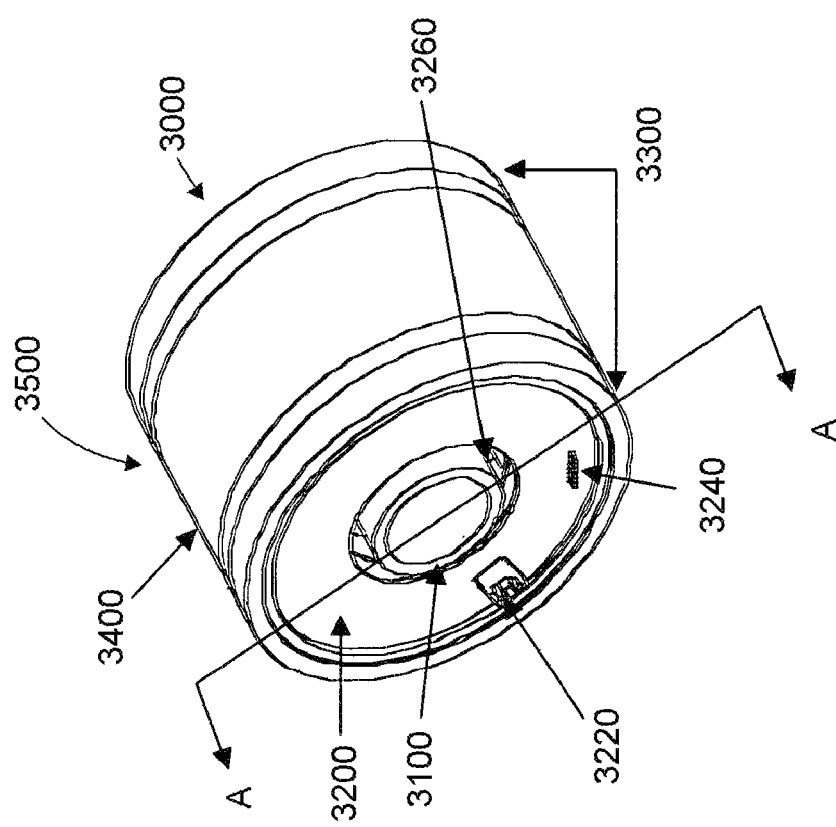
FIG. 3 is a perspective view of an exemplary embodiment of a system 3000.

FIG. 3 shows an exemplary rotor 3100 and stator 3500 of an exemplary magnetic thrust bearing system 3000, and FIG. 4 shows an exemplary thrust rotor system 4000. Rotor 3100, which can include a thrust disk 4300, can be mounted via, e.g., an interference fit, on a sleeve 4200, which can be mounted via, e.g., an interference fit, on the outside diameter of the rotating shaft 4100 of a machine and can rotate with the shaft 4100. Thrust disk 4300 can be fabricated from a high strength steel alloy such as AISI 4340. Stator 3500 can include two thrust magnets 3300 that can be positioned on either side of thrust disk 4300 and/or can be spaced apart axially by the spacer annulus 3400. One or more rotation sensors 3260 can be located within stator 3500 for sensing a rotational position, rotational speed, and/or rotational direction of rotor 3100. Stator 3500 can include all the electronics for magnetic thrust bearing system 3000. As shown in FIG. 3, at one end of stator 3500 can be cover plate 3200 that can comprise a communications connector 3220 and/or a power connector 3240. For example, the communication protocol can be Ethernet so that magnetic thrust bearing system 3000 can be part of an Ethernet network and/or it can be easily connected to other devices. Many other communication protocols are possible, including CAN, MODBUS, and/or other serial protocols.

Figure 5:
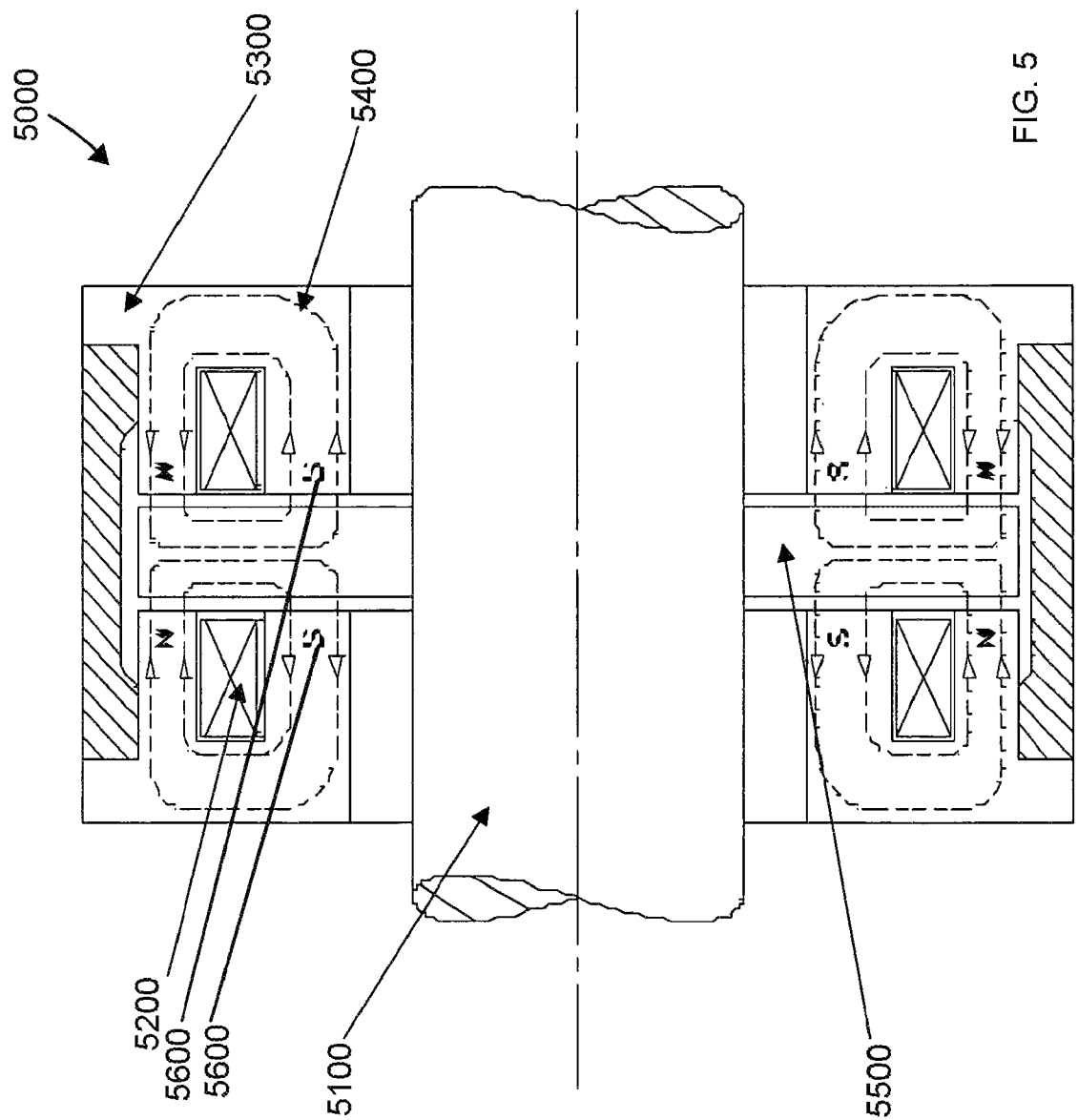
FIG. 5 is a cross-sectional view of an exemplary embodiment of a system 3000 taken at section A-A of FIG. 3.

A potential principle of operation of an exemplary magnetic thrust bearing system 5000 is shown in FIG. 5. Thrust disk 5500 can be located on shaft 5100 between the two thrust magnets 5300, which can create bi-directional axial force on disk 5500. Shown are the coils 5200 located in a slot in each thrust magnet 5300, which can be used to control the magnitude of the attractive force between the thrust disk 5500 and the magnets. The strength of the flux 5400 that circulates around each coil 5200 is typically proportional to the current in each coil 5200. The magnetic force between each thrust magnet 5300 and thrust disk 5500 is typically proportional to the square of the coil current. If thrust disk 5500 is not centered between the two thrust magnets 5300, the current can be increased in one magnet and reduced in the other to effect a force on thrust disk 5500 that tends to center thrust disk 5500 between the magnets 5300. The thrust magnets 5300 can be fabricated from a low carbon steel such as AISI 1018.

Figure 6:
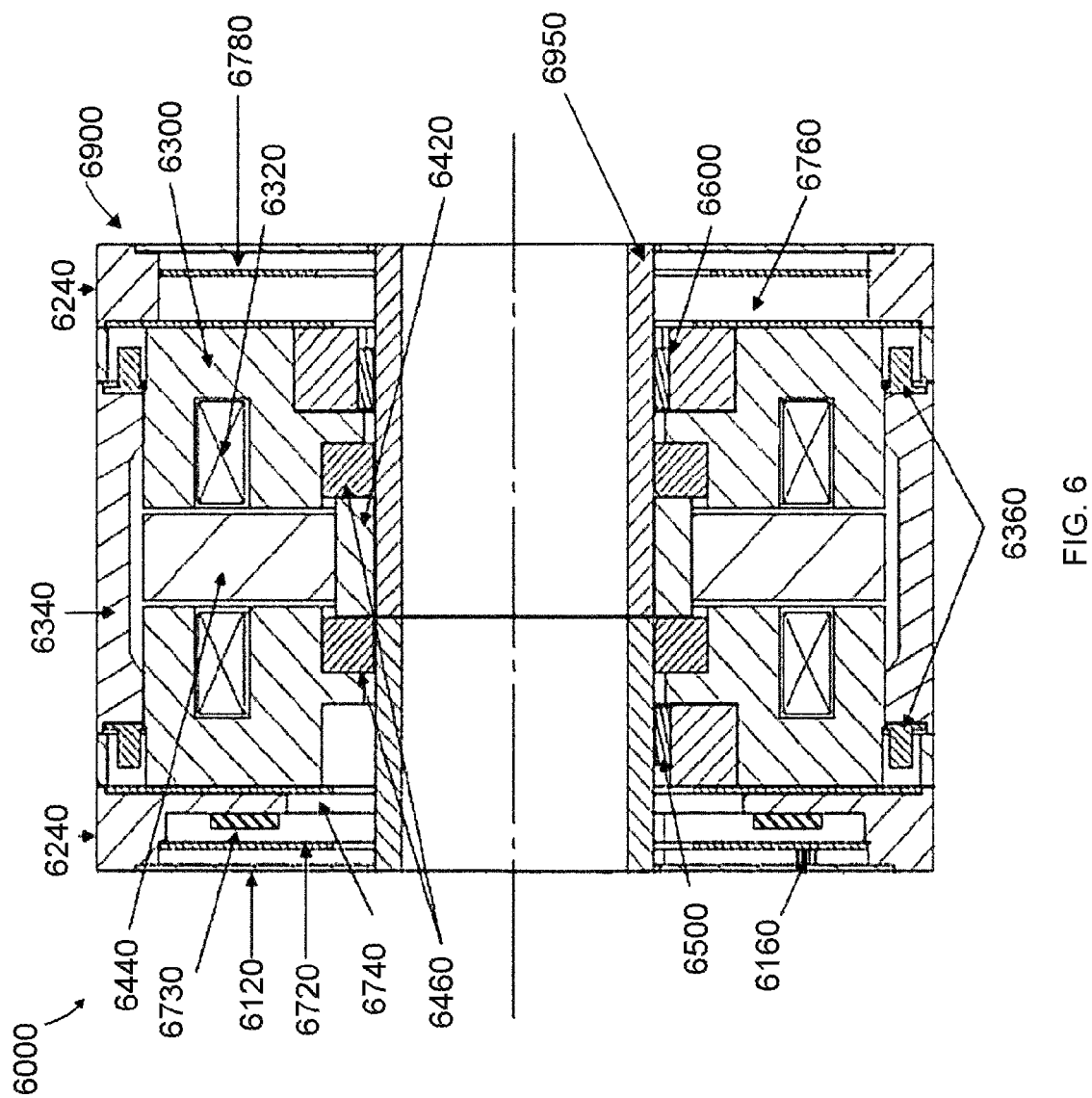
FIG. 6 is a cross-sectional view of an exemplary embodiment of a system 4000 taken at section A-A of FIG. 3.

FIG. 6 shows a cross section of an exemplary magnetic thrust bearing system 6000. The axial position of thrust disk 6440 can be detected by six axial sensors 6600, which can sense via, e.g., eddy current, optical, and/or capacitive techniques. If thrust disk 6440 is not centered between the two thrust magnets 6300, the current can be increased in one magnet and reduced in the other to effect a force on thrust disk 6440 that can tend to center thrust disk 6440 between the magnets 6300. By averaging the measured position for the six axial sensors 6600, the signal-to-noise ratio can be improved and the influence of tilt and radial motion of thrust disk 6440 on the measured axial position can be minimized.

In addition to the axial sensors 6600, the stator 6900 can include two rotation sensors 6500 that can detect a step on the surface of shaft 6950 as it rotates. The once-per-revolution signal can be used to measure the rotational speed of shaft 6950 and/or can provide a signal from which the angular position of shaft 6950 can be estimated. By including two rotation sensors 6500, the rotational direction of shaft 6950 can be determined.

Also shown in FIG. 6 are the integrated electronic components. Power can be passed through cover plate 6120 to power circuit board 6720, which can be annular. Power circuit board 6720 can take the input voltage, which can be approximately 48 $V_{DC}$, and can convert it to the lower voltages typically required for some of the electronic components. Power circuit board 6720 can contain the electronic components that can control the switching of the power transistors 6730, which can be field-effect transistors.

Power transistors 6730 can be mounted on heat sink 6240, which can radially outwardly conduct the heat dissipated in power transistors 6730. Heat sink 6240 can be fabricated from aluminum because of its excellent thermal conductivity.

Spacer annulus 6340 can maintain the axial spacing between the two thrust magnets 6300. Included in spacer annulus 6340 can be axial passages for wires that can route signals and/or power between the circuit boards on either side of thrust disk 6440. Feedthrough connectors 6360 can be provided on the faces of spacer annulus 6340 to facilitate assembly of the thrust magnetic bearing system 6000. Feedthrough connectors 6360 can mate with matching connectors on routing board 6740 and/or shield board 6760, which can be annular circuit boards that can route signals and/or power to the other circuit boards. Shield board 6760 can shield processor circuit board 6780 from electromagnetic interference.

Processor circuit board 6780 can be an annular circuit with an onboard digital signal processor (DSP) that can determine the desired level of magnetic flux from each thrust magnet 6300 to produce the desired net force on the rotor, and/or the required transistor switching waveform to achieve this flux. The desired level of magnetic flux can be determined by an algorithm running on the DSP, potentially using the axial position of shaft 6950 as measured by axial sensors 6600, such as a PID algorithm via which desired forces vary with position error.

Touchdown rings 6460, fabricated from a soft alloy such as bronze, can be embedded in each thrust magnet 6300. Touchdown rings 6460 can serve as protective surfaces to prevent contact between thrust disk 6440 and thrust magnets 6300. The nominal axial clearance between touchdown rings 6460 and thrust collar 6420 can be approximately 0.010 in on either side of thrust disk 6440. The nominal axial clearance between thrust disk 6440 and each thrust magnet 6300 can be between approximately 0.020 in and 0.030 in.

Figure 7:
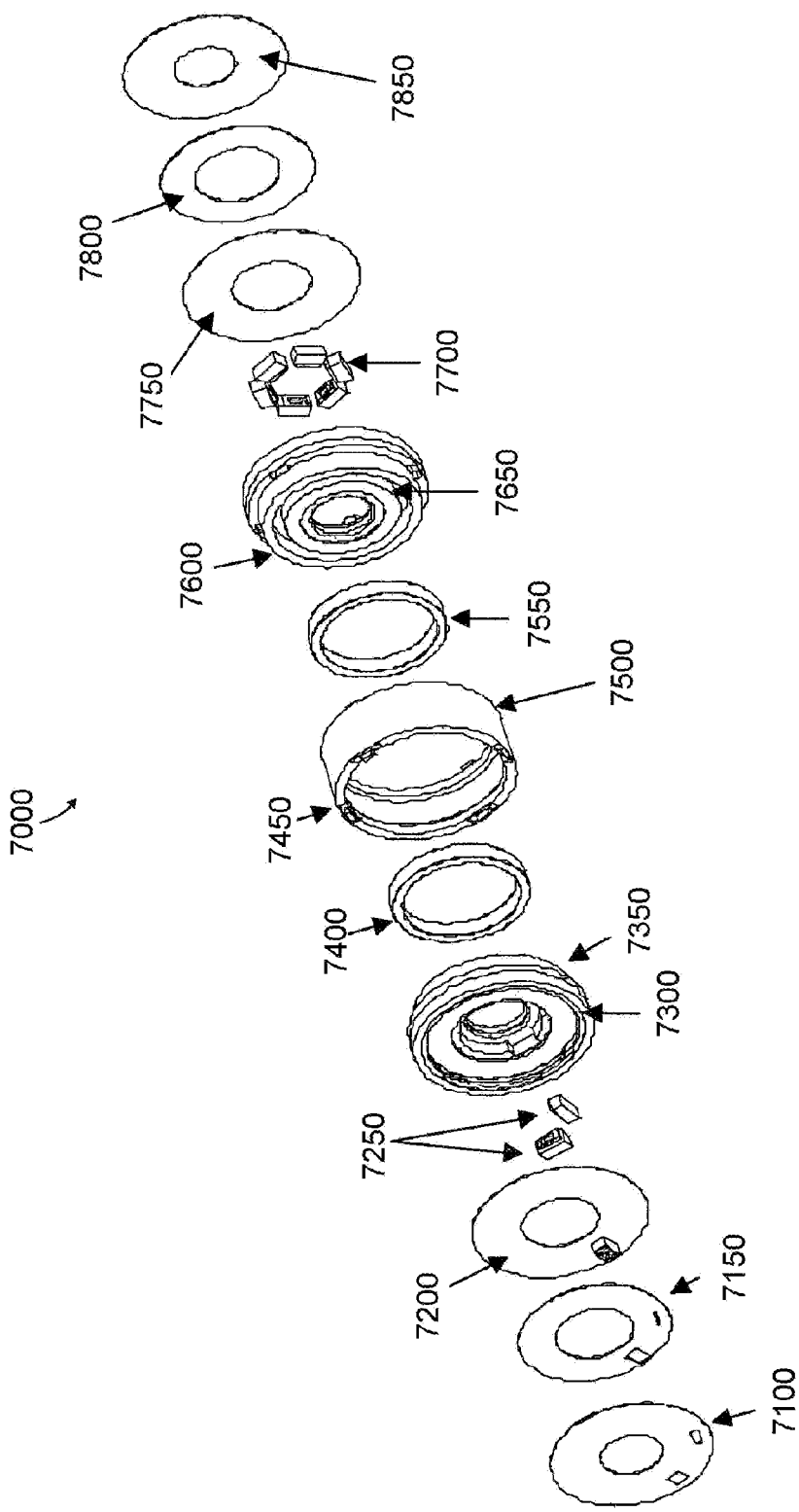
FIG. 7 is an exploded perspective view of an exemplary embodiment of a system 7000.

FIG. 7 shows an exploded view of the components for an exemplary magnetic thrust bearing system 7000, which can comprise: cover plate 7100, power circuit board 7150, routing circuit board 7200, rotation sensors 7250, heat sink 7300, thrust magnet 7350, coil 7400, feed-through connector 7450, spacer annulus 7500, coil 7550, thrust magnet 7600, coil slot 7650, axial sensor 7700, shield circuit board 7750, processor circuit board 7800, and/or cover plate 7850.

Certain exemplary embodiments can provide:
1) an electronic controller, including sensing, processing, and amplification, packaged within the stator structure of the thrust magnetic bearing;
2) communications with the thrust magnetic bearing without the need for an external electronic controller;
3) a thrust magnetic bearing with circuit boards of an annular shape that can be packaged on either side of the thrust magnets;
4) a single processor board on one side of thrust disk and single power board on the other side of disk controlling currents in both thrust magnets by routing signals and power through the space annulus with no external wiring required;
5) power transistors mounted on a heat sink on one side of thrust disk to radially conduct heat out of the thrust magnetic bearing;
6) a thrust magnetic bearing with embedded touchdown surfaces to protect the thrust magnet and thrust disk; and/or
7) multiple (e.g., 6) axial sensors to improve the signal-to-noise ratio and/or reduce the cross coupling of radial and tilt motion.

At least some of the items listed above (e.g., items 3, 6, and/or 7) can be used with a system having a remote electronic controller.

Figure 8:
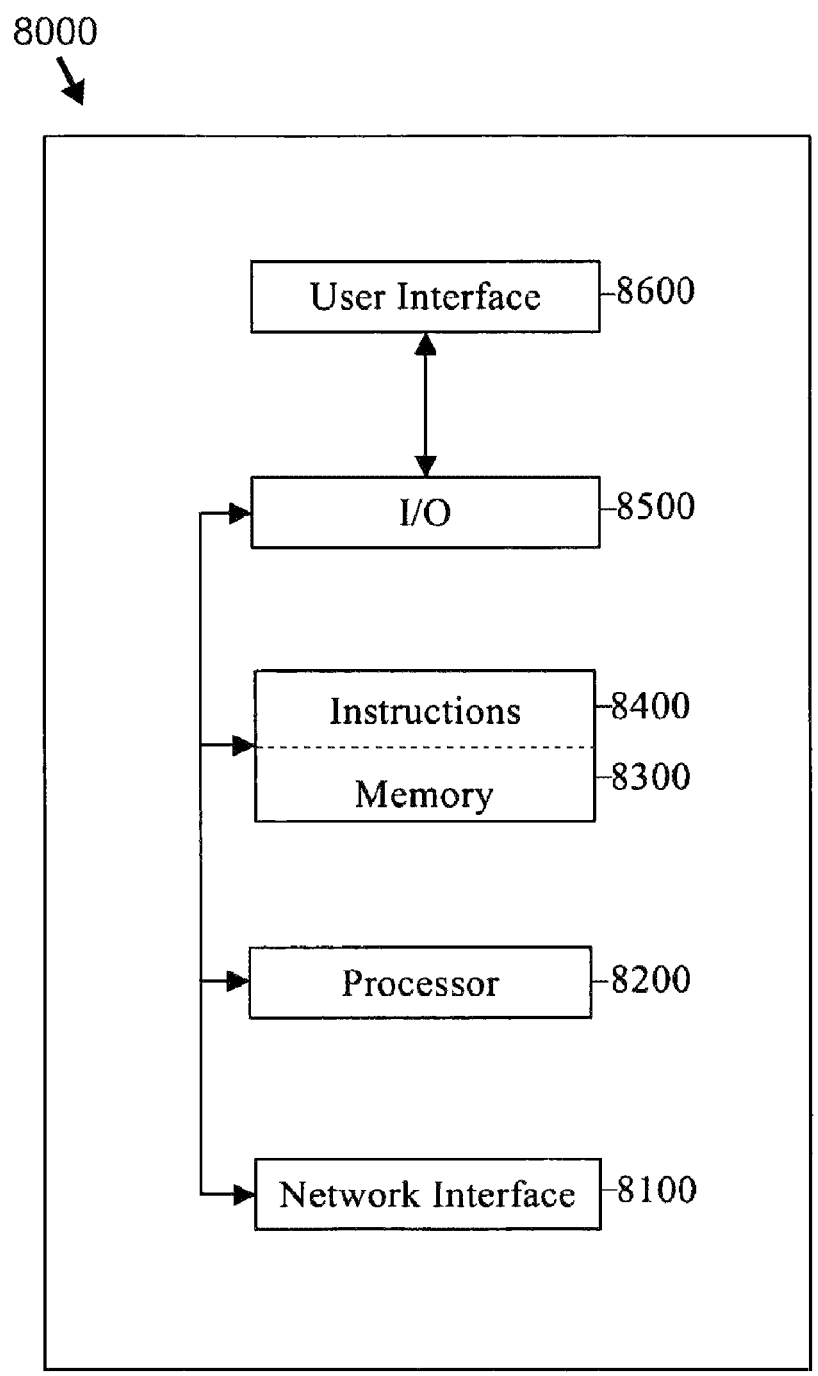
FIG. 8 is a block diagram of an exemplary embodiment of an information device 8000.

FIG. 8 is a block diagram of an exemplary embodiment of an information device 8000, which in certain operative embodiments can comprise, for example, electronic controller 1200 of FIG. 1 and/or processor circuit board 6780 and/or integrated electronic components of FIG. 6. Information device 8000 can comprise any of numerous transform circuits, which can be formed via any of numerous communicatively-, electrically-, magnetically-, optically-, fluidically-, and/or mechanically-coupled physical components, such as for example, one or more network interfaces 8100, one or more processors 8200, one or more memories 8300 containing instructions 8400, one or more input/output (I/O) devices 8500, and/or one or more user interfaces 8600 coupled to I/O device 8500, etc.

In certain exemplary embodiments, via one or more user interfaces 8600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Certain exemplary embodiments can provide: a machine comprising:
- a magnetic thrust bearing comprising:
  - a rotor portion;
  - a stator portion; and/or
  - housing substantially surrounding said stator portion and said rotor portion;
  - wherein:
    - said rotor portion comprises a thrust disk adapted to be circumferentially attached to a rotor and to rotate with the rotor, said thrust disk defining a thrust disk first side and a thrust disk second side, said first side opposing said second side; and/or
    - said stator portion comprises:
      - a first thrust electromagnet and an opposing second thrust electromagnet, said first thrust electromagnet adapted to be separated by a first gap from said thrust disk first side, said second thrust electromagnet adapted to be separated by a second gap from said thrust disk second side;
      - a first touchdown surface adapted to prevent contact between said first thrust electromagnet and any rotating component of said rotor portion;
      - a second touchdown surface adapted to prevent contact between said second thrust electromagnet and any rotating component of said rotor portion;
- an electronic controller adapted to control said first thrust electromagnet and said opposing second thrust electromagnet;
- said electronic controller is adapted to substantially center said rotor between said first thrust electromagnet and said opposing second thrust electromagnet;
- said electronic controller is adapted to control a pulse-width signal input to an amplifier that provides currents provided to said first thrust electromagnet and said opposing second thrust electromagnet, said currents adapted to produce a net force that substantially centers said rotor between said first thrust electromagnet and said opposing second thrust electromagnet;
- said electronic controller is adapted to control a position of said rotor in response to a received rotor position signal;
- said electronic controller is adapted to, via a network connection, receive control programming adjustments from a sender external to said machine and/or transmit control reports to a recipient external to said machine;
- said electronic controller is adapted to, via an Ethernet connection, receive control programming adjustments from a sender external to said machine and/or transmit control reports to a recipient external to said machine;
- said electronic controller comprises an annular circuit board located adjacent one of said thrust electromagnets;
- said first touchdown surface is embedded in said first thrust electromagnet; and/or
- said machine comprises the rotor.

In various exemplary embodiments, the machine can comprise:
- an axial sensor located adjacent one of said touchdown surfaces, said axial sensor adapted to provide a signal indicative of an approximate axial position of the rotor with respect to said magnetic thrust bearing;
- a plurality of axial sensors located adjacent one of said touchdown surfaces and radially distributed around a rotational axis of said rotor portion, each of said axial sensors adapted to provide a signal indicative of an approximate axial position of the rotor with respect to said magnetic thrust bearing;
- a first rotation sensor substantially surrounded by said housing and adapted to be separated from the rotor by a rotation sensing gap, said first rotation sensor adapted to detect an approximate rotational speed of the rotor with respect to said stator portion;
- an amplifier comprised by said stator portion, said amplifier adapted to increase the apparent power provided to an electromagnetic coil comprised by said stator portion, said amplifier and said electromagnetic coil located substantially within said housing;
- a plurality of switch-type pulse-width modulated amplifiers comprised by said stator portion, each of said amplifiers adapted to increase the apparent power provided to a corresponding electromagnetic coil comprised by said stator portion, said plurality of amplifiers and said plurality of electromagnetic coils located substantially within said housing;
- an annular processor circuit board comprised by said stator portion, said processor circuit board comprising a digital signal processor adapted to determine a pulse-width input signal to an amplifier that produces a current provided to said first thrust electromagnet, said current adapted to control a magnetic flux level for said first thrust electromagnet;
- an annular processor circuit board comprised by said stator portion, said processor circuit board comprising a digital signal processor adapted to determine a pulse-width input signal to an amplifier that supplies currents provided to said first thrust electromagnet and said opposing second thrust electromagnet, said currents adapted to produce a net force that substantially centers said rotor between said first thrust electromagnet and said opposing second thrust electromagnet, said currents based on an axial position of said rotor;
- an annular processor circuit board comprised by said stator portion, said processor circuit board comprising a digital signal processor adapted to determine a pulse-width input signal to an amplifier that provides currents provided to said first thrust electromagnet and said opposing second thrust electromagnet, said currents based on a desired flux level for each of said first thrust electromagnet and said opposing second thrust electromagnet;

an annular power circuit board comprised by said stator portion, said power circuit board adapted to provide electrical power to each of said electromagnets;
an annular power circuit board comprised by said stator portion, said power circuit board adapted to provide switching signals to power transistors that are adapted to supply currents to said first thrust electromagnet and said opposing second thrust electromagnet;
a first annular heat sink comprised by said stator portion, said first heat sink adapted to conduct heat away from said first thrust electromagnet;
a first annular heat sink comprised by said stator portion, said first heat sink adapted to conduct heat away from power transistors that are adapted to supply a current to said first thrust electromagnet;
a first annular heat sink comprised by said stator portion, said first heat sink adapted to conduct heat substantially radially, outwardly, and away from a plurality of power transistors comprised by said stator portion, said power transistors adapted to supply an electrical current to said first thrust electromagnet;
a pair of opposing annular cover plates comprised by said housing, at least one of said cover plates comprising a power aperture adapted to snugly surround an electrical power conduit; and/or
an annular spacer comprised by said stator portion, said annular spacer adapted to maintain an predetermined axial spacing between said first thrust electromagnet and second thrust electromagnet, said annular spacer defining at least one axial aperture adapted to at least partially surround a power conduit associated with at least one of said electromagnets and/or a communication conduit associated with at least one of said electromagnets;

Certain exemplary embodiments can provide: a machine comprising:
a magnetic thrust bearing comprising:
a rotor portion;
a stator portion;
a housing substantially surrounding said stator portion and said rotor portion;
an annular processor circuit board adapted to produce a net force that substantially centers said rotor between said first thrust electromagnet and said opposing second thrust electromagnet, said annular processor circuit board physically separated from, and electrically shielded from, said annular power circuit board; and/or
a plurality of power transistors mounted on said first annular heat sink;
wherein:
said rotor portion comprises a thrust disk adapted to be circumferentially attached to a rotor and to rotate with the rotor, said thrust disk defining a thrust disk first side and a thrust disk second side, said first side opposing said second side;
said stator portion comprises:
a first thrust electromagnet and an opposing second thrust electromagnet, said first thrust electromagnet adapted to be separated by a first gap from said thrust disk first side, said second thrust electromagnet adapted to be separated by a second gap from said thrust disk second side;
an annular power circuit board adapted to provide switching signals to a plurality of power transistors to provide electrical power to each of said electromagnets;
a first annular heat sink located adjacent said annular power circuit board, said first annular heat sink adapted to conduct heat away from said first thrust electromagnet and away from said power transistors; and/or
said annular power circuit board is adapted to provide switching signals to a plurality of power transistors mounted on said first annular heat sink.

DEFINITIONS

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
activity—an action, act, step, and/or process or portion thereof.
adapted to—made suitable or fit for a specific use or situation.
adjacent—in close proximity to, near, next to, and/or adjoining.
adjust—to change so as to match, fit, adapt, conform, and/or be in a more effective state.
amplifier—a device that increases strength of signals passing through it.
and/or—either in conjunction with or in alternative to.
annular—shaped like a ring.
aperture—an opening, hole, gap, passage, and/or slit.
apparatus—an appliance or device for a particular purpose
apparent power—a value computed by multiplying the root-mean-square (rms) current by the root-mean-square voltage and commonly measured in units such as volt-amps.
approximate—nearly the same as.
associate—to join, connect together, and/or relate.
at least—not less than.
attach—to fasten, secure, couple, and/or join.
automatically—acting or operating in a manner essentially independent of external influence or control. For example, an automatic light switch can turn on upon "seeing" a person in its view, without the person manually operating the light switch.
axial—located on, around, or in the direction of an axis.
axis—a straight line about which a body or geometric object rotates or can be conceived to rotate and/or a center line to which parts of a structure or body can be referred.
based—being derived from and/or dependent upon.
bearing—a device that supports, guides, and reduces the friction of motion between fixed and moving machine parts.
between—in a separating interval and/or intermediate to.
Boolean logic—a complete system for logical operations.
can—is capable of, in at least some embodiments.
cause—to produce an effect.
center—(n) a point that is substantially equally distant from the outer boundaries of something; (v) to move and/or align something with respect to a central point, line, and/or plane.

circuit—a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.

circuit—an electrically conductive pathway and/or a communications connection established across two or more switching devices comprised by a network and between corresponding end systems connected to, but not comprised by the network.

circuit board—a substantially flat plastic and/or fiberglass board on which interconnected circuits and/or components are laminated and/or etched, the circuits having microprocessors, memories, transistors, capacitors, resistors, diodes, and/or other electronic components mechanically mounted and/or electrically coupled directly thereto.

circumference—a boundary line of a substantially circular figure, area, and/or object.

coil—(n) a continuous loop comprising two or more turns of electrically conductive material. (v) to roll and/or form into a configuration having a substantially spiraled cross-section.

communication—a transmission and/or exchange of information.

component—a constituent element and/or part.

comprising—including but not limited to.

conduct—to act as a medium for conveying something such as heat and/or electricity.

conduit—a tube, channel, and/or duct for substantially enclosing electric wires and/or cable.

configure—to make suitable or fit for a specific use or situation.

connect—to join or fasten together.

connection—a physical and/or logical link and/or channel between two or more points in a system. For example, a wire, an optical fiber, a wireless link, and/or a virtual circuit, etc.

contact—to touch.

containing—including but not limited to.

control—(n) a mechanical or electronic device used to operate a machine within predetermined limits; (v) to exercise authoritative and/or dominating influence over, cause to act in a predetermined manner, direct, adjust to a requirement, and/or regulate.

controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

convert—to transform, adapt, and/or change.

corresponding—related, assoiacted, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

cover—a substantially planar object configured to protect and/or conceal.

create—to bring into being.

current—a flow of electrical energy.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of, and/or to precisely and/or distinctly describe and/or specify.

desired—indicated, expressed, and/or requested.

detect—to sense, perceive, identify, discover, ascertain, respond to, and/or receive the existence, presence, and/or fact of.

determine—to obtain, calculate, decide, deduce, establish, and/or ascertain.

device—a machine, manufacture, and/or collection thereof.

digital—non-analog and/or discrete.

digital signal processor—a programmable digital microprocessor adaptable to perform calculations and/or manipulations on signals.

disk—a thin, substantially flat, substantially circular object and/or plate.

each—every one of a group considered individually.

electrical—relating to producing, distributing, and/or operating by electricity.

electromagnet—a device comprising a coil of insulated wire wrapped around an iron core that becomes magnetized when an electric current flows through the wire.

electronic—digitally processed, stored, and/or transmitted.

embed—to fix firmly in a surrounding mass, to enclose snugly and/or firmly, and/or to cause to be an integral part of.

estimate—to calculate and/or determine approximately and/or tentatively.

Ethernet—a frame-based computer networking technology for local area networks (LANs). It defines wiring and signaling for the physical layer, and frame formats and protocols for the media access control (MAC)/data link layer of the OSI model.

external—relating to, existing on, and/or connected with the outside or an outer part; exterior.

force—a capacity to do work or cause physical change.
from—used to indicate a source.
further—in addition.
gap—an interruption of continuity and/or a space between objects.
generate—to create, produce, give rise to, and/or bring into existence.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
having—including but not limited to.
heat—energy associated with the motion of atoms and/or molecules and capable of being transmitted through solid and fluid media by conduction, through fluid media by convection, and through a fluid and/or empty space by radiation.
heat sink—a device adapted to transfer thermal energy away from a connected object and/or a device that absorbs and/or dissipates heat generated by a system.
housing—something that covers, encloses, protects, holds, and/or supports, such as a frame, box, and/or chassis.
human-machine interface—hardware and/or software adapted to render information to a user and/or receive information from the user; and/or a user interface.
including—including but not limited to.
increase—to become greater or more in size, quantity, number, degree, value, intensity, and/or power, etc.
indicative—serving to indicate.
information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.
initialize—to prepare something for use and/or some future event.
input—a signal, data, and/or information provided to a processor, device, and/or system.
input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
install—to connect or set in position and prepare for use.
instructions—directions, which can be implemented as firmware and/or software, the directions adapted to perform a particular operation or function.
located—situated in a particular spot and/or position.
logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine—a device and/or vehicle adapted to perform at least one task.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

magnetic—having the property of attracting iron and certain other materials by virtue of a surrounding field of force.

magnetic flux level—a measure of a quantity of magnetism, being the total number of magnetic lines of force passing through a specified area in a magnetic field. Also known as magnetic flux density per unit area, the SI unit for which is the weber.

maintain—to retain, preserve, sustain, keep in an existing state, and/or continue to obtain.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

mount—(n) that upon which a thing is attached. (v) to couple, fix, and/or attach on and/or to something.

net—overall, resulting, and/or average.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

opposing—opposite; against; being the other of two complementary or mutually exclusive things; and/or placed or located opposite, in contrast, in counterbalance, and/or across from something else and/or from each other.

outwardly—toward an outer surface and/or circumference of.

packet—a generic term for a bundle of data organized in a specific way for transmission, such as within and/or across a network, such as a digital packet-switching network, and comprising the data to be transmitted and certain control information, such as a destination address.

pair—a quantity of two of something.

partially—to a degree, but not necessarily totally.

perceptible—capable of being perceived by the human senses.

physical—tangible, real, and/or actual.

physically—existing, happening, occurring, acting, and/or operating in a manner that is tangible, real, and/or actual.

physically separated—spaced apart.

plate—a flat rigid body.

plurality—the state of being plural and/or more than one.

portion—a part, component, section, percentage, ratio, and/or quantity that is less than a larger whole. Can be visually, physically, and/or virtually distinguishable and/or non-distinguishable.

position—(n) a place and/or location, often relative to a reference point. (v) to place and/or locate.

power—energy, a measure of energy and/or work, and/or a rate at which work is done, expressed as the amount of work per unit time and commonly measured in units such as watt and horsepower.

predetermined—established in advance.

prevent—to impede, hinder, stop, and/or keep from happening.

probability—a quantitative representation of a likelihood of an occurrence.

processor—a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

produce—to generate via a physical effort, manufacture, and/or make.

project—to calculate, estimate, or predict.

provide—to furnish, supply, give, convey, send, and/or make available.

pulse—a transient variation of a quantity (such as electric current or voltage) whose value is otherwise constant. Sometimes repeated with a regular period and/or according to some code.

pulse width modulated—encoded via variation of pulse widths radially—moving and/or directed along a radius.

radially distributed—located at equally spaced positions around a circumference of a circle.

receive—to gather, take, acquire, obtain, accept, get, and/or have bestowed upon.

recommend—to suggest, praise, commend, and/or endorse.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

report—a presentation of information in a predetermined format.

request—to express a desire for and/or ask for.

rotate—to turn about an axis.

rotation—an act or process of turning around a center or an axis.

rotational—about and/or around an axis.

rotational speed—a velocity at which an object turns around a center or an axis. A rotational speed can be expressed in terms of a number of revolutions in a given time period.

rotor—a rotating part of a machine.

said—when used in a system or device claim, an article indicating a subsequent claim term that has been previously introduced.

select—to make a choice or selection from alternatives.

sender—a source of a transmission.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electromagnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.

separated—not touching and/or spaced apart by something.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

shield—(n) a protective device or structure; (v) to cover up, conceal, and/or protect from, such as to protect from electromagnetic radiation and/or magnetic flux.

side—a surface bounding a solid object.

signal—automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magneto-motive force, magnetic field intensity, magnetic field flux, magnetic flux density, reluctance, permeability, index of refraction, optical wavelength, polarization, reflectance, transmittance, phase shift, concentration, and/or temperature, etc., that encode information, such as machine-implementable instructions for activities and/or one or more letters, words, characters, symbols, signal flags, visual displays, and/or special sounds, etc., having prearranged meaning. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

snugly—close-fitting and/or securely.

spacer—an object that defines and/or fills a gap.

spacing—a separation.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

speed—a linear, curviliear, and/or angular velocity and/or a linear, curviliear, and/or angular distance traveled during a predetermined time interval.

stator—a stationary part in or about which another part (the rotor) revolves.

store—to place, hold, and/or retain data, typically in a memory.

substantially—to a considerable, large, and/or great, but not necessarily whole and/or entire, extent and/or degree.

supply—make available for use.

support—to bear the weight of, especially from below.

surface—an outer boundary of an object or a material layer constituting or resembling such a boundary.

surround—to encircle, enclose, and/or confine on several and/or all sides.

switch—(n) a mechanical, electrical, and/or electronic device that opens and/or closes circuits, completes and/or breaks an electrical path, and/or selects paths and/or circuits and/or a device that establishes a connection between disparate transmission path segments in a network (or between networks). (v) to electrically energize or de-energize.

system—a collection of mechanisms, devices, machines, articles of manufacture, processes, data, and/or instructions, the collection designed to perform one or more specific functions.

thrust bearing—a bearing arranged to receive a thrust or longitudinal axially-directed force on a shaft.

touchdown—relating to contact between a rotor and a stator.

transform—to change in measurable: form, appearance, nature, and/or character.

transistor—a device that regulates current or voltage and acts as a switch or gate for electronic signals.

transmit—to provide, furnish, supply, send as a signal, and/or to convey (e.g., force, energy, and/or information) from one place and/or thing to another.

type—a number of things having in common traits or characteristics that distinguish them as a group or class.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

voltage—(a.k.a., "potential difference" and "electromotive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

weight—a value indicative of importance.

wherein—in regard to which; and; and/or in addition to.

with respect to—in relation to.

within—inside.

Note

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A machine, comprising:
a magnetic thrust bearing, comprising:
   a rotor portion;
   a stator portion; and
   a housing substantially surrounding said stator portion and said rotor portion;
   said rotor portion comprising:
      a thrust disk adapted to be circumferentially attached to a rotor and to rotate with the rotor, said thrust disk defining a thrust disk first side and a thrust disk second side, and said thrust disk first side opposing said thrust disk second side; and
   said stator portion comprising:
      a first thrust electromagnet and an opposing second thrust electromagnet, said first thrust electromagnet adapted to be separated by a first gap from said thrust disk first side, and said opposing second thrust electromagnet adapted to be separated by a second gap from said thrust disk second side;
      a first touchdown surface adapted to prevent contact between said first thrust electromagnet and any rotating component of said rotor portion;
      a second touchdown surface adapted to prevent contact between said opposing second thrust electromagnet and any rotating component of said rotor portion;
      an electronic controller adapted to control said first thrust electromagnet and said opposing second thrust electromagnet; said electronic controller comprising an amplifier adapted to increase apparent power provided to an electromagnetic coil comprised by said stator portion;
      a first annular heat sink located adjacent to an annular power circuit board, said first annular heat sink adapted to conduct heat substantially radially, outwardly, and away from a plurality of power transistors, said plurality of power transistors mounted on said first annular heat sink; and
      an annular processor circuit board adapted to produce a net force that substantially centers said rotor between said first thrust electromagnet and said opposing second thrust electromagnet, said annular processor circuit board physically separated from, and electrically shielded from, said annular power circuit board.

2. The machine of claim 1, further comprising:
an axial sensor located adjacent one of said first and second touchdown surfaces, said axial sensor adapted to provide a signal indicative of an approximate axial position of the rotor with respect to said magnetic thrust bearing.

3. The machine of claim 1, further comprising:
a plurality of axial sensors located adjacent one of said first and second touchdown surfaces and radially distributed around a rotational axis of said rotor portion, each axial sensor of said plurality of axial sensors adapted to provide a signal indicative of an approximate axial position of the rotor with respect to said magnetic thrust bearing.

4. The machine of claim 1, further comprising:
a first rotation sensor substantially surrounded by said housing and adapted to be separated from the rotor by a rotation sensing gap, said first rotation sensor adapted to detect an approximate rotational speed of the rotor with respect to said stator portion.

5. The machine of claim 1, wherein:
said amplifier is one of a plurality of switch-type pulse-width modulated amplifiers comprised by said stator portion, each of said switch-type pulse-width modulated amplifiers adapted to increase apparent power provided to a corresponding electromagnetic coil comprised by said stator portion, said plurality of switch-type pulse-width modulated amplifiers and said plurality of electromagnetic coils located substantially within said housing.

6. The machine of claim 1, wherein:
said electronic controller is adapted to substantially center said rotor between said first thrust electromagnet and said opposing second thrust electromagnet.

7. The machine of claim 1, wherein:
said electronic controller is adapted to control a pulse-width signal input to the amplifier that provides currents provided to said first thrust electromagnet and said opposing second thrust electromagnet, said currents adapted to produce the net force that substantially centers said rotor between said first thrust electromagnet and said opposing second thrust electromagnet.

8. The machine of claim 1, wherein:
said electronic controller is adapted to control a position of said rotor in response to a received rotor position signal.

9. The machine of claim 1, wherein:
said electronic controller is adapted to, via a network connection, receive control programming adjustments from a sender external to said machine and/or transmit control reports to a recipient external to said machine.

10. The machine of claim 1, wherein:
said electronic controller is adapted to, via an Ethernet connection, receive control programming adjustments from a sender external to said machine and/or transmit control reports to a recipient external to said machine.

11. The machine of claim 1, wherein:
said electronic controller comprises an annular circuit board located adjacent one of said first thrust electromagnet and said opposing second thrust electromagnet.

12. The machine of claim 1, wherein:
said annular processor circuit board comprises a digital signal processor adapted to determine a pulse-width input signal to the amplifier that produces a current provided to said first thrust electromagnet, said current adapted to control a magnetic flux level for said first thrust electromagnet.

13. The machine of claim 1, wherein:
said annular processor circuit board comprises a digital signal processor adapted to determine a pulse-width input signal to the amplifier that supplies currents to said first thrust electromagnet and said opposing second thrust electromagnet, said currents adapted to produce the net force that substantially centers said rotor between said first thrust electromagnet and said opposing second thrust electromagnet, said currents based on an axial position of said rotor.

14. The machine of claim 1, wherein:
said annular processor circuit board comprises a digital signal processor adapted to determine a pulse-width input signal to the amplifier that supplies currents to said first thrust electromagnet and said opposing second thrust electromagnet, said currents based on a desired flux level for each of said first thrust electromagnet and said opposing second thrust electromagnet.

15. The machine of claim 1, wherein:
said annular power circuit board is comprised by said stator portion, and said annular power circuit board is adapted to provide electrical power to each of said first thrust electromagnet and said opposing second thrust electromagnet.

16. The machine of claim 1, wherein:
said annular power circuit board is comprised by said stator portion, and said annular power circuit board is adapted to provide switching signals to the plurality of power transistors that are adapted to supply currents to said first thrust electromagnet and said opposing second thrust electromagnet.

17. The machine of claim 1, wherein:
said first annular heat sink is adapted to conduct heat away from said first thrust electromagnet.

18. The machine of claim 1, further comprising:
a pair of opposing annular cover plates comprised by said housing, at least one of said opposing annular cover plates defining a power aperture adapted to snugly surround an electrical power conduit.

19. The machine of claim 1, further comprising:
an annular spacer comprised by said stator portion, said annular spacer adapted to maintain an predetermined axial spacing between said first thrust electromagnet and said opposing second thrust electromagnet, said annular spacer defining at least one axial aperture adapted to at least partially surround a power conduit associated with at least one of said first thrust electromagnet and said opposing second thrust electromagnet and/or a communication conduit associated with at least one of said first thrust electromagnet and said opposing second thrust electromagnet.

20. The machine of claim 1, wherein:
said first touchdown surface is embedded in said first thrust electromagnet.

21. The machine of claim 1, wherein:
said machine comprises the rotor.

22. A machine, comprising:
a magnetic thrust bearing, comprising:
  a rotor portion;
  a stator portion; and
  a housing substantially surrounding said stator portion and said rotor portion,
  said rotor portion comprising:
    a thrust disk adapted to be circumferentially attached to a rotor and to rotate with the rotor, said thrust disk defining a thrust disk first side and a thrust disk second side, and said first side opposing said second side, and
  said stator portion comprising:
    a first thrust electromagnet and an opposing second thrust electromagnet, said first thrust electromagnet adapted to be separated by a first gap from said thrust disk first side, said opposing second thrust electromagnet adapted to be separated by a second gap from said thrust disk second side;
    an annular power circuit board adapted to provide switching signals to a plurality of power transistors to provide electrical power to each of said first thrust electromagnet and said opposing second thrust electromagnet;
    a first annular heat sink located adjacent said annular power circuit board, said first annular heat sink adapted to conduct heat away from said first thrust electromagnet and away from said plurality of power transistors, said plurality of power transistors mounted on said first annular heat sink; and
    an annular processor circuit board adapted to produce a net force that substantially centers said rotor portion between said first thrust electromagnet and said opposing second thrust electromagnet, said annular processor circuit board physically separated from, and electrically shielded from, said annular power circuit board.

23. A machine, comprising:
a magnetic thrust bearing, comprising:
  a rotor portion;
  a stator portion; and
  a housing substantially surrounding said stator portion and said rotor portion,
  said rotor portion comprising:
    a thrust disk adapted to be circumferentially attached to a rotor and to rotate with the rotor, said thrust disk defining a thrust disk first side and a thrust disk second side, and said thrust disk first side opposing said thrust disk second side, and
  said stator portion comprising:
    a first thrust electromagnet and an opposing second thrust electromagnet, said first thrust electromagnet adapted to be separated by a first gap from said thrust disk first side, said opposing second thrust electromagnet adapted to be separated by a second gap from said thrust disk second side;
    an annular power circuit board adapted to provide switching signals to a plurality of power transistors to provide electrical power to each of said first thrust electromagnet and said opposing second thrust electromagnet;
    a first annular heat sink located adjacent said annular power circuit board, said first annular heat sink adapted to conduct heat away from said first thrust electromagnet and away from said plurality of power transistors; and
    an annular processor circuit board adapted to produce a net force that substantially centers said rotor between said first thrust electromagnet and said opposing second thrust electromagnet, said annular processor circuit board physically separated from, and electrically shielded from, said annular power circuit board.

* * * * *